G. H. THOMAS.
VEHICLE WHEEL.
APPLICATION FILED MAR. 5, 1909.
972,734.
Patented Oct. 11, 1910.
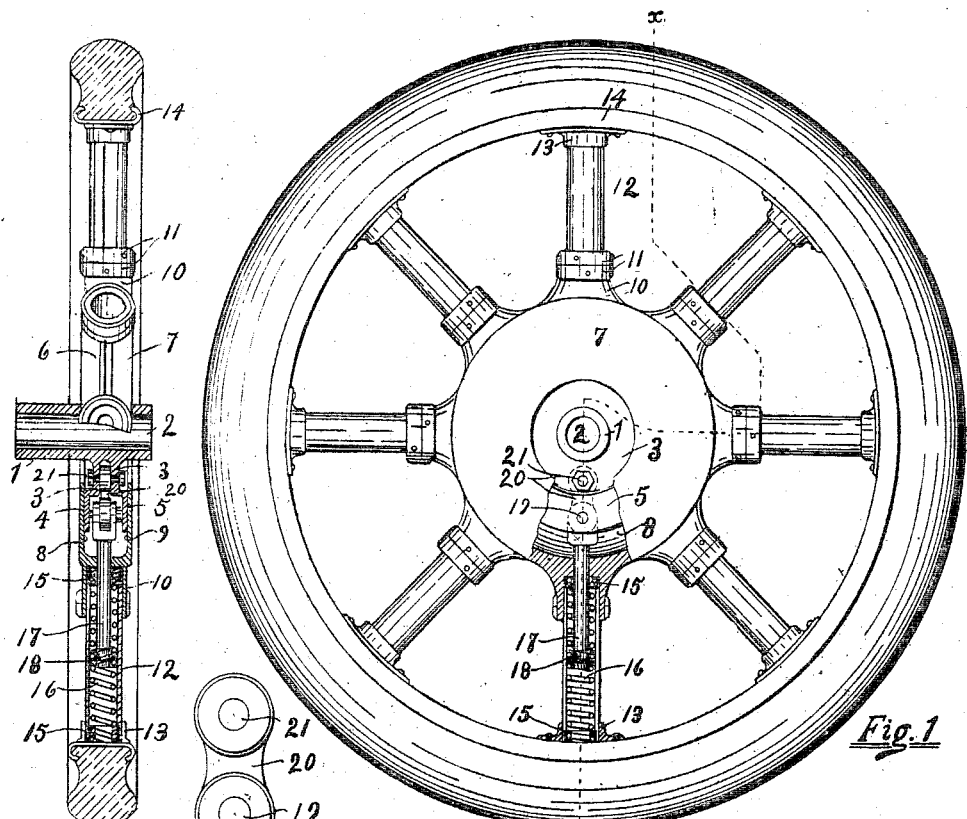
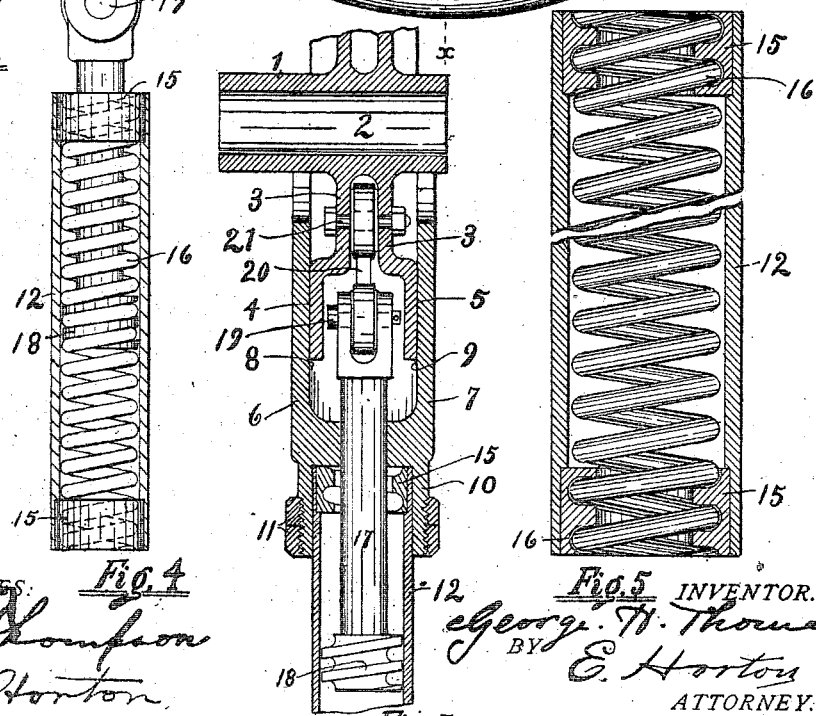
WITNESSES:
C. F. Thompson
J. R. Horton
INVENTOR.
George H. Thomas
BY E. Horton
ATTORNEY.

UNITED STATES PATENT OFFICE.

GEORGE H. THOMAS, OF ELMIRA, NEW YORK, ASSIGNOR TO THOMAS RESILENT WHEEL COMPANY, OF ELMIRA, NEW YORK, A CORPORATION OF NEW YORK.

VEHICLE-WHEEL.

972,734.  Specification of Letters Patent.  Patented Oct. 11, 1910.

Application filed March 5, 1909. Serial No. 481,420.

*To all whom it may concern:*

Be it known that I, GEORGE H. THOMAS, a subject of Great Britain, residing at Elmira, in the county of Chemung and State of New York, have invented certain new and useful Improvements in Vehicle-Wheels, of which the following is a specification.

My invention relates to vehicle wheels, and has for its object the production of a strong, light-weight, practical and efficient wheel, adapted to the use of vehicles of all kinds and especially automobiles where economy in tires with resiliency of action in the wheels are desired. I attain these objects in the device shown in the accompanying illustrations, more particularly hereinafter described and set forth in claims.

Referring to the drawings Figure 1 is a side elevation with a part in section of a wheel embodying my improvements. Fig. 2 is a vertical cross section in part as represented by the dotted line X—X in Fig. 1. Fig. 3 is a view in detail of an enlarged transverse central section of a portion of spoke and hub with one of the spring carrier rods and link shown in full. Fig. 4 is an enlarged view in detail of one of the hollow spokes in section but showing in full the spring with its retaining collars and the carrier rod and link, the rod connecting the spring centrally and as retained within the spoke. Fig. 5 is an enlarged sectional view in detail of spoke and spring holding collars and spring, as all are retained together.

In constructing a wheel to embody my improvements 1 represents a hub having a central axial opening 2 by which it may be secured to the axle of any desired vehicle, said hub about midway its length forming the center for two radial disks 3 their outer flange portions being opposingly offset forming outer annular radial surfaces 4 and 5.

6 and 7 represent the two parts of an outside secondary hub or casing arranged with internal annular surfaces 8 and 9 to adjoin and have movable contact upon the flanged surfaces 4 and 5, thus providing guides for limited radial movements of the two hubs upon each other and securing a firmness of coöperation in them in opposition to lateral strain.

Around the periphery of the outer hub parts at 10 as they are joined together, are formed circular extensions which are threaded slightly tapering and firmly locked with the other hub parts into union by the encircling taper threaded locked rings 11, thus forming strong hub sockets in which the inner ends of hollow spokes 12 are radially seated and gripped, with their outer ends secured in flanged collars 13, suitably riveted or bolted to the internal side of a felly or lock-rim 14, to the periphery of which is locked a flexible solid rubber tire for an outer tread.

The spokes are composed of cylindrical pieces having a larger bore for a short way in at each end, and in each of which is seated a spring holding collar 15 internally threaded of like pitch to screw over the ends of a spring coil 16 fitting within the cylinder and of corresponding length.

Carrier rod 17, "so termed" is provided at one end with a screw threaded enlargement 18, arranged to screw through the collars 15, and springs of the spokes and engage the springs about midway of length, the other end of said rods passing radially inward to between the offset portions of the disk flanges of the axle hub, and having a bisected end within which, is pivoted on a pin 19, short links 29, that are again pivoted by pin 21, farther on in between and to the flanges 3 as they come closer together adjoining the axle hub. It will be seen, that the carrier rods as thus suspended and in their central attachment to the springs, if given any movement in either direction, will not only have to compress that part of the spring in direction in which each one is moving, but will also have to expand the other part of the spring as well. Thus double the force is exerted upon the rod by this connection, than what would be the result, if two springs were used of half the length with alternate action, or if one spring were used of equal length, and affixed to the rod at one of its ends and compressed and expanded in its movements. It will also be seen, that by reason of the short link connecting each carrier rod with the axle hub, that no eccentric position of the axle in the wheel can be produced by weight of the carriage, without more or less movement endwise of each of the carrier rods whether they happen to be in vertical or horizontal positions; thus every spring in the wheel is in part compressed and in part expanded, in supporting the axle with its load. The wheel may contain a greater or less number of the spokes and springs as thus arranged.

Having thus fully described my invention, what I claim as new and desire to secure by Letters Patent is—

1. In a vehicle wheel in combination, a central hub having a transverse opening, an outer hub casing with a transverse opening for the central hub, external annular flanges on said central hub operatively engaging the walls of said outer hub, spokes engaging the felly and gripped in the outer hub by threaded rings, each spoke having an internally threaded collar seated in each end, and a coil spring with its ends engaged by the collar threads, and rods operatively connecting the central hub to the springs midway of their length whereby all of the springs are compounded in action at once in support of the central hub.

2. A vehicle wheel having a central hub to carry the axle, an outer hub casing with a transverse opening for the central hub, cylindrical spokes interposed between the outer hub and tire carrying felly, each spoke having within it a coil spring secured at each end by an internally threaded collar, rods connected to the central hub by links, and having their outer ends enlarged with threads engaging each of the springs midway their lengths, whereby all of the springs are made active at the same time in support of the axle.

In testimony whereof I affix my signature in presence of two witnesses.

GEORGE H. THOMAS.

Witnesses:
C. F. THOMPSON,
W. M. UFFORD.